United States Patent
Weisensel et al.

(10) Patent No.: US 7,648,932 B2
(45) Date of Patent: Jan. 19, 2010

(54) MOLDED POROUS CERAMIC ARTICLE CONTAINING BETA-SIC AND PROCESS FOR THE PRODUCTION THEREOF

(75) Inventors: Lars Weisensel, Johannesberg (DE); Thomas Wolff, Münchberg (DE); Heino Sieber, Ingolstadt (DE); Peter Greil, Weisendorf (DE)

(73) Assignee: Mann+Hummel Innenraumfilter GmbH & Co. KG (DE)

( * ) Notice: Subject to any disclaimer, the term of this patent is extended or adjusted under 35 U.S.C. 154(b) by 35 days.

(21) Appl. No.: 11/481,874

(22) Filed: Jul. 5, 2006

(65) Prior Publication Data
US 2007/0032370 A1    Feb. 8, 2007

(30) Foreign Application Priority Data
Jul. 5, 2005    (EP)    ................... 05014531

(51) Int. Cl.
C04B 35/565    (2006.01)
C04B 38/00    (2006.01)
B32B 3/12    (2006.01)
B01D 39/20    (2006.01)

(52) U.S. Cl. .................... 501/88; 501/89; 501/90; 501/91; 501/92; 501/95.2; 501/80; 501/81; 501/82; 501/83; 428/116; 428/118; 55/523; 502/178; 502/240; 502/242; 502/254; 502/263; 502/527.16; 502/257.24; 264/43; 264/630; 264/646; 264/647; 264/682

(58) Field of Classification Search .................. 501/88, 501/89, 90, 91, 92, 95.2, 80–83; 428/116, 428/118; 55/523; 502/178, 240, 242–245, 502/254–260, 263, 527.16, 527.18, 527.19, 502/527.24; 264/43, 630, 646, 647, 682
See application file for complete search history.

(56) References Cited

U.S. PATENT DOCUMENTS

| 4,481,179 A | 11/1984 | Wei |
| 4,514,346 A | 4/1985 | Luhleich et al. |
| 4,564,496 A | 1/1986 | Gupta et al. |

(Continued)

FOREIGN PATENT DOCUMENTS

DE    37 19 606 C2    12/1988

(Continued)

OTHER PUBLICATIONS

Greil, et al., "Effect of microstructure on the fracture behavior of biomorphous silicon corbide ceramics," Journal of the European Ceramic Society, vol. 22, (2002), pp. 2697-2707.

(Continued)

Primary Examiner—Karl E Group
(74) Attorney, Agent, or Firm—Ostrolenk Faber LLP

(57) ABSTRACT

The invention relates to a process for the production of a molded porous ceramic article containing β-SiC, which process comprises the following steps: the preparation of a molded article containing silicon and carbon and the subsequent pyrolysis and siliconization of the article containing silicon and carbon to form SiC. The invention further relates to a molded porous ceramic article containing SiC which has been produced from a molded article containing silicon and carbon.

48 Claims, 9 Drawing Sheets

U.S. PATENT DOCUMENTS

| | | | |
|---|---|---|---|
| 4,777,152 A | | 10/1988 | Tsukada |
| 5,324,692 A | | 6/1994 | Benker et al. |
| 5,429,780 A | | 7/1995 | Prin et al. |
| 5,474,587 A | | 12/1995 | Dias et al. |
| 5,853,444 A | * | 12/1998 | Maier et al. ............ 55/523 |
| 5,914,187 A | * | 6/1999 | Naruse et al. ............ 428/327 |
| 6,555,031 B2 | * | 4/2003 | Gadkaree et al. ............ 264/29.7 |
| 6,582,796 B1 | * | 6/2003 | Joulin et al. ............ 428/116 |
| 6,699,561 B2 | | 3/2004 | Wolff |
| 6,793,873 B2 | | 9/2004 | Gadow et al. |
| 7,017,757 B2 | | 3/2006 | Wolff et al. |
| 7,316,722 B2 | * | 1/2008 | Komori et al. ............ 55/523 |
| 2002/0011683 A1 | | 1/2002 | Gadkaree et al. |
| 2002/0142146 A1 | | 10/2002 | Gadow et al. |
| 2003/0012938 A1 | | 1/2003 | Bauer et al. |
| 2003/0168757 A1 | | 9/2003 | Bauer et al. |
| 2003/0180538 A1 | | 9/2003 | Gray |
| 2005/0084717 A1 | | 4/2005 | Tani et al. |
| 2006/0093784 A1 | * | 5/2006 | Komori et al. ............ 428/116 |
| 2006/0194018 A1 | * | 8/2006 | Ohno et al. ............ 428/116 |

FOREIGN PATENT DOCUMENTS

| | | | |
|---|---|---|---|
| DE | 40 25 239 | | 8/1990 |
| DE | 4409 377 | | 3/1994 |
| DE | 694 29 323 | | 6/1994 |
| DE | 197 11 831 | | 3/1997 |
| DE | 197 27 115 | | 1/1998 |
| DE | 101 04 882 | | 2/2001 |
| DE | 102 13 016 | | 3/2002 |
| EP | 0294850 A1 | | 12/1988 |
| EP | 0 657 403 A1 | | 6/1995 |
| EP | 0 796 830 | | 3/1996 |
| EP | 1 338 322 | | 10/2001 |
| EP | 1 544 184 | | 7/2003 |
| EP | 1541817 | * | 6/2004 |
| EP | 1 666 146 | | 8/2004 |
| EP | 1500799 | * | 1/2005 |
| EP | 1514588 | * | 3/2005 |
| WO | WO 93/13303 | | 7/1993 |
| WO | WO 00/01463 | | 1/2000 |
| WO | WO 01/98207 | | 12/2001 |
| WO | WO 2005/049524 | | 6/2005 |

OTHER PUBLICATIONS

Qian, et al., "Preparation and properties of porous microcellular SiC ceramics by reactive infiltration of Si vapor into carbonized basswood," Materials Chemistry and Physics, vol. 82, (2003), pp. 648-653.

Morancais, et al., "High porosity SiC ceramics prepared via a process involving an SHS stage,"Journal of the European Ceramic Society, vol. 23, (2003), pp. 1949-1956.

Greil, et al., "Biomorphic Cellular Silicon Carbide Ceramics from Wood: I. Processing and Microstructure," Journal of the European Ceramic Society, vol. 18, (1998), pp. 1961-1973.

Hillig, "Meld infiltration Approach to Ceramic Matrix Composites," Communications of the American Ceramic Society, 71[2] C-96-C99 (1988).

Brunauer, et al., "Adsorption of gases in multimolecular layers," Journal of the American Chemical Society, vol. 60, pp. 309-319, (1938).

Fitzer, et al., "Fiber-Reinforced Silicon Carbide," American Ceramic Society Bulletin, vol. 65, No. 2, pp. 326-335 (1986).

* cited by examiner

MOLDED POROUS CERAMIC ARTICLE CONTAINING BETA-SIC AND PROCESS FOR THE PRODUCTION THEREOF

CROSS REFERENCE TO RELATED APPLICATIONS

The present application claims priority of European Application No. 05014531.7 filed Jul. 5, 2005.

TECHNICAL FIELD

The invention relates to a molded porous ceramic article containing β-SiC and to a process for the production thereof.

FIELD OF THE INVENTION

SiC-based materials are employed for a multiplicity of different applications, especially where high stability at high temperatures or high corrosion resistances are required. Highly porous, and therefore lightweight, SiC-based ceramics are used to an increasing extent as supports for catalysts, and as items of kiln furniture, insulating materials, and substrate materials or are needed for gas combustion in porous medium burners or for solar energy systems and also as filter materials for the purification of waste gases at high temperatures.

In past decades, a number of processes has been described concerned with the siliconization of semifinished molded parts comprising different compositions of carbon, SiC and Si. In addition to the siliconization of fibrous structures of various weaves and various web constructions, the powder technology route has also been described (W. B. Hillig "Melt Infiltration Approach to Ceramic Matrix Composites" J. Am. Ceram. Soc. 71 (1988) C96-C99, E. Fitzner and R. Gadow, "Fiber-Reinforced Silicon Carbide", Am. Cer. Soc. Bull. 65 (1986) 326). DE 197 11 831 A1 describes a process in which a dense, carbon fiber-reinforced composite ceramic based on SiC and carbon is produced for use as a brake disk, which is subsequently infiltrated with Si and siliconized.

The processes described above, in which different semifinished materials are used for Si infiltration, a procedure is adopted in which the semifinished materials are prepared from Si, SiC, and C powders or from the corresponding fibers and then siliconized by means of an Si melt. Following siliconization, almost impervious components of SiC or SiC/C ceramic are formed. These processes, however, are not suitable for the production of porous SiC-based components.

In addition to the production of impervious Si/SiC ceramics, in past years different processes for the production of porous SiC ceramics, in particular by means of the powder technology route based on SiC powders, have also been described (DE 197 27 115 A1—Porous SiC ceramic and process for the production thereof based on SiC, DE 40 25 239 C1—Process for the production of molded articles from Si-infiltrated silicon carbide or silicon carbide and carbon, DE 37 19 606 C2—Process for the siliconization of porous molded articles of SiC and carbon by the action of elemental silicon, DE 694 293 23 T2/EP 0 657 403 B1—Porous ceramic material and process for the production thereof starting from silicon carbide and ceramic powder).

There are three different types of process for the production of porous extruded articles of SiC.

Firstly, molded articles are extruded from the corresponding SiC powders containing different additives and are subsequently sintered. The sintering of the SiC takes place in such cases at very high temperatures above 2000° C., these being necessary for recrystallization of the SiC and thus for the formation of a stable, porous SiC structure (U.S. Pat. No. 4,777,152).

WO 93/13303 describes the production of molded articles from SiC powder, in which recrystallization temperatures above 2000° C. are likewise needed. Owing to the very high hardness of the α-SiC particles, however, the extrusion dies are subjected to very high wear, which makes the process cost-intensive. A further, even higher cost factor, however, is the recrystallization at temperatures above 2000° C. In addition to the enormous energy consumption, the high maintenance costs for the furnace are conspicuous, since the wear on the graphite heaters increases exponentially at temperatures above 1800° C.

In the abovementioned processes, recrystallization of the SiC is carried out at temperatures above 2000° C. in order to achieve the desired pore distribution and the necessary strength. At these temperatures, β-SiC is converted to α-SiC. In the individual particle, α-SiC has greater strength than β-SiC, which is why this modification is also used as a grinding agent. In porous filter structures, however, the important factor is not so much the strength of the individual particle, but rather the strength of the overall porous structure, i.e. the binding of the SiC particles to one another and the pore size and the porosity of the structure.

Secondly, a route described in various applications proceeds via the starting substances silicon and carbon, the carbon itself being in some cases obtained from precursors by means of pyrolysis. WO 01/98207 describes the mixing of metallic silicon with a pyrolyzable polymer (for example a phenolic resin), which following pyrolysis is converted to SiC at temperatures of from 1400° C. to 1800° C. EP 0 796 830 B1 describes the extrusion of a mixture of metallic silicon with graphitic carbon and subsequent formation of SiC, which has to be recrystallized at temperatures of from 2000° C. to 2300° C. to produce a suitable pore size.

Thirdly, U.S. Pat. No. 6,582,796 describes the mixing of SiC powder with a ceramic binder. The SiC is mixed with oxidic ceramic constituents and extruded and subsequently fired at a temperature of 1600° C. under an oxidizing atmosphere. Here again, SiC is present in the starting substance to be extruded, which leads to very high abrasion and wear on the extrusion die.

SUMMARY OF THE INVENTION

It is an object of the invention to provide an improved process for the production of porous ceramics based on SiC, in which the expenditure of energy is lower and the wear and abrasion on the molding dies is decreased.

It is a further object to provide a molded porous ceramic article based on SiC having a definable pore structure and adequate porosity and a fine cellular structure (channel density), which is suitable for very effective retention of fine dust particles and has outstanding temperature stability and chemical and mechanical resistances.

The object on which the invention is based is achieved by the provision of a process for the production of a molded porous ceramic article comprising β-SiC, which process comprises the following steps:

(a) preparation of a molded porous article containing silicon and carbon, from a composition which comprises silicon-containing particles preferably having a particle size in the range of from 0.001 to 190 μm, and carbon-containing particles preferably having a particle size in the range of from 0.001 to 150 μm and preferably a coking organic binder, and (b) pyrolysis of the molded article containing silicon and carbon as made available in step (a) at a temperature of from 600 to 1000° C.

(c) siliconization of the molded article containing silicon and carbon by heating it to a temperature in a range from 1150 to 1700° C. with the formation of the molded article containing β-SiC.

The process according to the invention makes it possible to produce a molded article containing β-SiC at low temperatures and without a recrystallization step, whereby the expenditure of energy is reduced.

Preferred developments of the process for the production of highly porous ceramic molded articles are indicated in subordinate claims 2 to 20.

Preferably, the composition from which the molded porous article containing silicon and carbon is prepared contains silicon-containing particles having a particle size in the range of from 0.001 to 100 μm and/or carbon-containing particles having a particle size in the range of from 0.001 to 50 μm.

Preferably, the siliconization is carried out at a temperature in a range of from 1420 to 1700° C., if silicon is used without the addition of further metals. Preferably, is siliconization is carried out at a temperature in the range of from 1150 to 1500° C., if silicon is used together with other metals with the formation of silicon/metal alloys.

Preferably, siliconization takes place in vacuo or under a blanket of argon. By carrying out the siliconization with the exclusion of oxygen, the formation of $SiO_2$ and/or SiO is largely prevented. This leads to SiC structures which are very acid-resistant and ash-resistant.

Preferably, the carbon-containing particles used in the process according to the invention have an internal surface area of at least 350 $m^2/g$ according to BET. The process for the determination of the BET value is carried out according to the procedure described by Brunauer, Emmet and Teller in the Journal of the American Chemical Society, volume 60, 1938, page 309. More preferably, the internal surface area of the carbon-containing particles is less than 1000 $m^2/g$ and more preferably less than 800 $m^2/g$.

Preferably, the particles containing silicon and carbon are not present as agglomerates and/or as granules to an extent of 80% by weight, preferably 90% by weight and more preferably 100%, based on the total weight of the porous molded article, these values referring to the total weight of the particles containing silicon and carbon. The molded article containing silicon and carbon preferably contains no SiC prior to siliconization.

In the process of the invention, it can be observed that the pore distribution is already established by the pore formation process, without recrystallization being necessary. The porous molded article containing β-SiC according to the invention is thus obtained directly from the starting substances, i.e. the starting substances react to give a porous structure containing β-SiC. Since the temperatures for this process lie below 1900° C., the porous molded article is mainly present in the β-phase. In addition, the process according to the invention is a very energy-efficient process, since the temperatures lie below 1900° C. and no recrystallization step is necessary. Preferably, the β-SiC present in the molded porous article containing β-SiC according to the invention consists of β-SiC (cubic crystal form of SiC) to an extent of 90% by weight, preferably 95% by weight, more preferably 98% by weight and most preferably 100% by weight, these values referring to SiC without alloy elements. β-SiC is formed from silicon and carbon at temperatures of from 1450 to 1900° C.

DETAILED DESCRIPTION OF CERTAIN EMBODIMENTS OF THE INVENTION

The terms "silicon-containing" and "containing silicon" are to be understood, within the scope of the invention, as meaning substances which comprise elemental silicon or silicon compounds, but preferably contain no silicon carbide. As elemental silicon, any Si modification, for example α, β, δ or γ-silicon, can be used. Organic and/or inorganic silicon compounds can be used. The organic silicon compounds used are preferably polymers which contain Si in their parent structural units, such as, for example, siloxanes, silsesquioxanes, polysilanes, polysiloxanes, or silicon oils, such as, for example, tetraethoxysilane (TEOS). The inorganic silicon compounds used are preferably silicides, for example $TiS_2$, $CrSi_2$, FeSi, and/or $FeSi_2$.

The terms "carbon-containing" and "containing carbon" are preferably to be understood, within the scope of the invention, as meaning substances which contain or consist of carbon in the graphite modification.

Preferably, carbons are used, the microcrystalline regions of which build up a porous structure, as is the case, for example, with activated coke and activated carbon. Activated coke is to be understood, within the scope of the invention, as meaning a carbon-containing substance which, following the carbonization of the raw material, already contains an internal surface. Carbonization, which is also described as coking, of certain starting substances such as, for example, the macroporous polymer adsorber Ambersorb 600® supplied by RohmHaas, already leads, without further activation, to internal surface areas of from 500 to 600 $m^2/g$.

Carbons, the microcrystalline regions of which form a porous structure, are particularly suitable for conversion to SiC by infiltration with silicon. The microporous structures, for example, of an activated carbon are particularly readily accessible for silicon if the silicon is present as a melt. Thus, by way of the melt, a vapor phase of silicon is formed and this silicon vapor diffuses into the pores of the activated carbon and reacts there to give SiC. By this means, a particularly good reactivity in the reaction of the molded carbon-containing article with the silicon is achieved, which article has a particularly high internal surface area of the carbon therein.

Preferably, the carbon-containing articles (which are also referred to below as pulverulent carbons) are selected from the group consisting of activated carbon, coke, coal, soot, graphite, pyrolyzed resin, and mixtures thereof. Activated carbon is more preferably used. On account of its microcrystalline structure, activated carbon has the property of reacting particularly well with silicon or silicon-containing substances to give SiC. Preferably, the reaction of silicon and the carbon-containing material, preferably activated carbon, is carried out at temperatures above the melting point of silicon. More preferably, the reaction of silicon and/or the silicon-containing material takes place with activated carbon, which is bonded by means of pyrolyzed resin.

The pulverulent carbons from the group consisting of activated carbon, coke, coal, soot, graphite, pyrolyzed resin, and mixtures thereof, can be prepared, for example, from starting materials such as wood, fruit kernels, fruit peel, pitch, or tar. Preferred pulverulent carbons are generally biomorphic carbons, i.e. carbons which are obtained by pyrolysis of biomorphic material, such as wood, fruit kernels, and fruit peel. Biomorphic carbons can be caused to react particularly readily with silicon to give SiC, since they contain microcrystalline regions to a great extent.

Carbon is ordered in graphite as a hexagonal structure in planes lying one above the other. In pure crystalline graphite, these planes are arranged parallel to one another and there are no disordered regions. In partly crystalline carbon, such as, for example, activated carbon, there are large regions in which the graphite planes are present in disordered relationship to one another. These are the amorphous regions. Within these amorphous regions there are small regions in which three to four graphite planes are present in a parallel relationship to one another. These regions are called microcrystalline regions. The expression "microcrystalline regions" is thus to be understood as meaning smaller regions in which three to four graphite planes are present parallel to one another.

Preferably, the biomorphic carbon is purified by an acid wash. By this means, mineral constituents which can still remain subsequently to the coking process are washed out to a large extent. Furthermore, metallic impurities, such as, for example, potassium, sodium, and calcium, are removed. In the reaction with liquid silicon, these metallic impurities would be locally dissolved in the latter and would locally reduce the reactivity of the Si melt which might lead to the termination of the conversion reaction. Suitable acids are, for example, hydrochloric acid and/or phosphoric acid, preferably in a concentration range of from 5 to 10% by weight, based on the total weight of the acid solution.

The term "siliconizing" is to be understood, within the scope of the invention, as meaning the reaction of compounds containing silicon and carbon to give SiC.

The term "coking" is to be understood, within the scope of the invention, as referring to substances which, on heating to above 500° C. under an inert atmosphere, leave a residue which consists of carbon to an extent of at least 85% by weight and preferably at least 95% by weight, based on the total weight of the residue.

The term "binders" is to be understood, within the scope of the invention, as meaning substances which on mixing with the compounds containing silicon and carbon form a substance from which a molded article containing silicon and carbon can be formed.

The binders used are preferably organic resins. Carbonizable resins are particularly preferred. Carbonizable resins are resins which can be converted to coke. Particular preference is given here to resins containing aromatic nuclei and epoxy resins. Phenolic resins have proven to be very suitable. Preferably, a pulverulent phenolic resin such as Novolak is used. On the one hand, Novolaks act as binders for the carbon particles, whilst on the other hand they also react with free silicon to form SiC, since they are converted by the pyrolysis into a so-called vitreous carbon. The use of a carbonizable resin is advantageous for stability following debindering and for stability in the porous molded article. "Debindering" is to be understood as meaning the pyrolytic decomposition of the binders and other auxiliaries, which can also be designated as a coking process or carbonization process. Without the carbonizable resin, the silicon and carbon particles would only be present in the molded article in a very weakly bonded framework. As a result of the use of carbonizable resin, the carbon particles and the silicon particles are bonded into a stable molded article via the carbonizable resin after debindering has taken place. The bonding of the carbon particles by means of the carbonized resin furthermore leads to an improvement in the stability of the SiC structure formed by the siliconizing process. Bonding between the SiC crystals in the porous structure is already established by the structure containing silicon and carbon.

The porosity of the molded ceramic article containing β-SiC can be adjusted extremely advantageously by means of the particle size of the carbon materials used for the production of the molded article containing silicon and carbon.

When using a coarse starting powder, a very coarsely porous structure is obtained in the pyrolyzed intermediate, from which a correspondingly coarsely porous SiC structure then results due to the fusion of the silicon and the formation of SiC. The pore formation process proceeds in this case as follows: as a result of the pyrolysis, a porous carbon structure is obtained in which the Si particles are integrated. By heating above the melting point of silicon, the silicon becomes liquid and is absorbed into the porous carbon structure. Preferably, siliconizing is carried out in vacuo or under an inert (oxygen-free) atmosphere, for example a blanket of argon. The melt filtered off by suction leaves pores which were filled beforehand with silicon particles. After the formation of the β-SiC, this pore structure remains. Accordingly, even smaller pores are obtained when using a smaller particle distribution of the silicon. The particle size distribution is selected according to the desired pore distribution in the molded porous article.

Since the matrix or structure predefined by the molded article containing silicon and carbon is siliconized, that is to say, is reacted with silicon or silicon-containing substances, the predefined matrix or structure is "transferred" to the molded article containing β-SiC. Thus, a molded article containing β-SiC and having a specific or defined porosity can be produced in a surprisingly simple manner.

In an advantageous embodiment of the process according to the invention, first a mixture of pulverulent carbons, pulverulent silicon, i.e. silicon-containing particles, organic binders and a liquid phase is prepared, which is subsequently extruded to give a molded article containing silicon and carbon.

In one embodiment, a molded article containing silicon and carbon is extruded as a channeled structure comprising a multiplicity of channels. Preferably, the channeled structure has channels which extend in the direction of the longitudinal axis of the molded article and are arranged substantially parallel to one another. The cross section of the channels is in general also designated as a "cell". Preferably, the channels have a square or polygonal cross section, for example a hexagonal or octagonal cross section. A hexagonal cross section is more preferred, since this presents a lower frictional resistance to gaseous and/or liquid substances flowing therethrough. Preferably, the channeled structure has a channel density of from 50 to 400 channels/inch$^2$, more preferably from 180 to 300 channels/inch$^2$ and most preferably from 200 to 300 channels/inch$^2$. "Channel density" is to be understood, within the scope of the invention, as meaning the number of channels per square inch as measured perpendicularly to the longitudinal axis of the channels in the molded porous article.

In one embodiment, the channels in the molded articles obtained in steps (a), (b) and/or (c) according to the present invention are alternately closed.

Since the deposition of soot particles on the molded porous article containing β-SiC, embodied, in particular, as a soot filter for a motor vehicle, takes place on the surface, very finely cellular channeled structures (having a high channel density) are extremely suitable. By this means, a lower pressure drop is achieved with a large filter surface area. This is important, since 10,000 l/min of gas have to be filtered by such a diesel soot filter.

The process according to the invention makes it possible to produce particulate filters, particular preference being given to diesel soot filters.

The channel wall thicknesses here should be as thin as possible in the molded particle containing β-SiC. An optimum must be found between mechanical strength of the overall filter and the channel wall strength. Furthermore, with regard to the channel wall thickness, there is the additional factor that, depending on the material employed, it is not possible to extrude arbitrarily thin walls. In particular, the use of SiC in the extrusion composition distinctly restricts the possibility of reducing the wall thickness.

In a preferred embodiment, the channel walls of the extruded article containing β-SiC have a wall thickness in the range of from 100 μm to 480 μm, preferably from 150 to 420 μm, more preferably from 150 to 400 μm, even more preferably from 200 to 380 μm and most preferably from 220 to 350 μm.

By this means, adequate stability and a distinctly increased surface area are achieved, which makes it possible to produce smaller filters. Particularly in the case of the waste gas purification of diesel vehicles, it is necessary to provide filters having a smaller volume. The production of thinner wall thicknesses is only made possible by the production process according to the invention, since no SiC is present in the starting composition. A reduction of the wall thickness by only 70 μm, accompanied by an increase in the channel density, distinctly enhances the surface area of the filter for a given volume. By combining a high channel density in a filter with small wall thicknesses there is obtained a distinctly increased filter surface area, which facilitates the production of smaller filters for a given surface area.

It has been shown that the rate of reaction of the carbon and silicon to form β-SiC can be controlled by means of the degree of crystallinity, the porosity, the pore distribution and the surface properties of the carbon.

In one embodiment, the silicon-containing particles have a particle size in the range of from 0.001 to 190 μm and/or the carbon-containing particles have a particle size in the range of from 0.001 to 150 μm. In a preferred embodiment, the silicon-containing particles have a particle size in the range of from 0.001 to 75 μm and preferably a $d_{50}$ value of from 20 to 30 μm and/or the carbon-containing particles have a particle size in the range of from 0.001 to 35 μm and preferably a $d_{50}$ value of from 8 to 15 μm.

For example, for a molded article having pores with a mean pore size in the range of from 10 to 15 μm, carbon-containing particles having a particle size in the range of from 8 to 15 μm or a particle size in the range of from 10 to 35 μm are used and silicon-containing particles having a particle size in the range of from 0.01 to 75 μm and a $d_{50}$ value of from 20 to 30 μm are used.

The $d_{50}$ value indicates the particle size which represents the upper limit for 50% of all particles, i.e. $d_{50}$ value=20 μm means that 50% of all particles in the powder of the respective substance are smaller than 20 μm.

Preferably, the molded article containing silicon and carbon as made available in step (b) contains these components in a mass ratio of silicon to carbon of from 2.33:1 to 5:1. With silicon-containing compounds, these data only refer to the proportion by mass of silicon which is present in the silicon-containing compound.

As a liquid phase, mixtures of aqueous solvents are preferably used. Water is more preferably used.

Furthermore, extrusion auxiliaries such as plasticizers, waxes, graphite and/or surfactants, etc. are preferably added to the mixture to be extruded. These extrusion auxiliaries bring about an improved slip of the particles relative to one another and lead to a homogeneous dispersion of all constituents during extrusion.

Green molding binders, for example cellulose ethers or cellulose ether derivatives, are preferably also added to the mixture to be extruded. For example, methylhydroxypropyl-cellulose can be used as a green molding binder. The green molding binder stabilizes the molded article. Moreover, the green molding binder also promotes homogenization of the various constituents of the mixture during extrusion.

In a preferred embodiment, fibers are also introduced into the mixture to be extruded. The fibers can be, for example, carbon fibers and/or chopped strands of SiC, in particular whiskers, and/or polymer fibers, which fibers have different functions.

The term "whiskers" is to be understood, within the scope of the invention, as meaning monocrystalline chopped strands. Chopped strands of SiC can be used for reinforcement of the SiC structure. Preferably, the SiC chopped strands consist of β-SiC.

The carbon fibers can cause an improvement in the mechanical stability. A carbon fiber-reinforced molded article containing SiC can be obtained by the introduction of carbon fibers based on PAN (polyacrylonitrile) or pitch. The carbon fibers are not adversely affected by the pyrolysis process and the fibers are partially siliconized from outside by the siliconization process, i.e. carbon lying on the outside is partially converted to SiC, whilst the carbon fibers in the core, however, remain present. The silicon reacts primarily with the particles of the preferably biomorphic carbons to give SiC and envelops the carbon fibers. As a result of this, the carbon fibers are protected from any oxidizing conditions which may occur. The carbon fibers introduced lead to a distinct improvement in the thermal shock stability, which is of special importance, in particular, for diesel soot filters. On account of an uneven soot load, inhomogeneous burn-off on or in the filter can occur during the regeneration process and can thus lead to an inhomogeneous heat load on the filter, which on account of the high thermal expansion coefficients of the β-SiC can lead to extreme thermal stresses in the filter and to fracture of the filter. In order to avoid this, the molded ceramic article containing β-SiC is preferably divided into segments, which are adhesively connected using an expansion joint. More preferably, the cement is a ceramic refractory adhesive, which due to admixture of thermally highly conductive material has a heat conductivity of more than 10 W/mK. The expression "refractory adhesive" is to be understood, within the scope of the invention, as meaning a ceramic-based composition which cures chemically or hydraulically and is temperature-resistant at least up to 1000° C. and preferably up to 1600° C.

When using polymer fibers, aligned and preferably linear pore structures can be produced in the molded article containing silicon and carbon after carrying out pyrolysis. The polymer fibers used are, for example, organic polymers which combust during the pyrolysis. Polymer fibers which can be used are, for example, PE fibers (polyethylene fibers). Other polymer fibers which may possibly be used are natural fibers such as jute, flax, cellulose, or lignin fibers. The polymer fibers combust partially or completely during the pyrolysis and leave behind cavities. The natural fibers are converted during the pyrolysis to form carbon fibers, as a result of which their volume decreases, or they are also combusted. By this means, aligned pore structures can be produced. Via the fiber diameter and the fiber length of the carbon fibers it is possible to adjust both the pore diameter and the pore length or depth in a defined manner. When using fiber mixtures of different fiber lengths and/or of different fiber diameters, a defined pore structure or pore distribution can be obtained in the molded article. By this means, a molded article containing SiC having a defined pore size, pore distribution and pore depth can be produced. Preferably, polymer fibers having a fiber length in the range of from 0.5 to 5 mm are employed. Instead of, or in addition to, the polymer fibers, a polymer powder can be used, in which case no aligned pore structure will be obtained.

After the extrusion, the molded article obtained is preferably pyrolyzed. The pyrolysis preferably takes place in an inert, preferably non-oxidizing, atmosphere. For example, the pyrolysis can be carried out in an inert gas atmosphere such as nitrogen. The pyrolysis can be carried out at a temperature of from 600° C. to 1000° C. During the pyrolysis, the extrusion auxiliaries are removed and the binders, such as, for example, phenolic resins, are carbonized and converted to vitreous carbon with reduction in volume and weight. As a result, pores are formed in the molded article.

The expression "vitreous carbon" is to be understood as meaning a form of carbon having a marked structural disorder and a glasslike fracture pattern. The carbon atoms having sp2 bonding are arranged in plane layers having hexagonal symmetry. In contrast to graphite, these layers are not arranged regularly over relatively large areas in vitreous carbon. Strips of graphitically ordered structures, layered one above the other, form a polymer-like coiled structure. Vitreous carbon is pore-free in the macro region, but between the graphite layers numerous cavities are present. This leads to an extremely high corrosion resistance to acid and alkaline reagents. Vitreous carbon is only attacked by oxygen above 600° C. and by oxidizing melts. Vitreous carbon can be readily converted in the resin/silicon powder mixture. External infiltration of vitreous carbon with Si melt is is not normally possible.

By the coextrusion of particles containing silicon and carbon, there is obtained, during the pyrolysis, a porous structure which contains the carbon and the silicon homogeneously mixed, the vitreous carbon (pyrolyzed resin) holding together both the carbon particles and the silicon particles as a binder. This structure has an extremely high contact area between silicon and carbon, which in turn leads to very rapid kinetics of SiC formation.

Since they are very easy to extrude, these molded porous articles containing silicon and carbon can be produced extremely advantageously by mass production methods and consequently very inexpensively.

The extruded articles containing silicon and carbon can have a cuboidal or cylindrical shape. The molded articles can alternatively have a polygonal cross section, for example a hexagonal or octagonal cross section. Preferably, the extruded carbon-containing articles have channels which extend in the direction of the longitudinal axis of the molded article and which are substantially arranged parallel to one another. The extruded articles containing silicon and carbon preferably have channels which extend in the direction of the longitudinal axis of the molded article and which are disposed substantially parallel to one another.

To produce the molded articles containing silicon and carbon, it is possible, for example, to use the production processes disclosed in DE 101 04 882 A1 and DE 102 13 016 A1, which are included herewith by way of reference, the molded article containing silicon and carbon being obtained by appropriate modification of said processes The content of silicon is increased in the formulation or the clay is replaced by silicon and the proportions of carbon and resin are adjusted such that the correct mixing ratio of silicon to carbon in the pyrolyzed molded article is obtained.

The production process according to the invention is preferably carried out in three heat treatment stages:
1. drying of the extruded article containing silicon and carbon with the formation of a green article,
2. pyrolysis under an inert atmosphere, e.g. under nitrogen with continuous flushing to discharge the pyrolysis products,
3. siliconization for conversion of the carbon and silicon to β-SiC, preferably in an oxygen-free atmosphere, for example in vacuo or under a blanket of argon.

Drying and pyrolysis are carried out, for example, using microwave technology. Both the carbon particles and the silicon particles couple to the microwave radiation on account of their conductivity. The carbon particles, in particular, are heated strongly by the microwave radiation. In this manner, the green articles can be heated to the pyrolysis temperature more rapidly with the aid of microwaves. Preferably, a process is used in which the green article is heated simultaneously from outside using conventional heating technology (for example by means of resistance heating elements such as Kantal heaters) and from inside using microwave technology. In order to avoid an influence of the inhomogeneous microwave field on the pyrolysis process, the temperature treatment is preferably carried out in a through-type oven.

In the drying step, the water is removed from the wet extruded green article. The dried molded article is obtained as a very dense structure, since in addition to the extrusion auxiliaries it also still contains the nonpyrolyzed resin partially in the fused state.

As a result of the pyrolysis, all auxiliaries such as the cellulose ether and the soap are removed from the structure by firing. Furthermore, the resin used is carbonized, i.e. it is converted into a pure carbon structure by elimination of degradation products. This causes a distinct reduction of volume. This controlled removal of the auxiliaries and some of the resin by firing leads to a porous structure. A porous carbon lattice results, in which the silicon particles are firmly integrated.

The pyrolysis of the extruded article containing silicon and carbon preferably takes place at a temperature of from 600 to 1000° C., more preferably at a temperature of from 700 to 900° C. and most preferably at a temperature of from 750 to 850° C. in an inert, oxygen-free, atmosphere. The pyrolysis preferably takes place in a nitrogen atmosphere. In order to prevent destruction or crack formation of the molded carbon-containing article by the gases formed during the pyrolytic decomposition of the organic binders and/or extrusion auxiliaries, preferably up to a temperature of about 400 to 500° C., a slow heating rate is chosen, for example a rate of from 1 to 2° C./min. Thereafter a higher heating rate, for example a rate of 5° C./min., can be used. The pyrolysis temperature is preferably maintained for from 0.25 to 4 hours and more preferably for from 0.5 to 1 hour.

The following siliconization step is preferably carried out at temperatures above the melting point of silicon, preferably at a temperature of from 1420 to 1700° C. The final temperature is preferably maintained for from 1 to 4 hours. The molten silicon is sucked into the porous carbon structure to leave cavities, which form the subsequent pores. At the halting point above the melting point, the conversion to β-SiC takes place. What is involved here is not a conventional sintering process, but a chemical conversion to a new compound. Preferably, the siliconization is carried out with the exclusion of oxygen. More preferably, the pyrolysis is carried out in vacuo or under a blanket of argon.

The pyrolysis and/or the siliconization are preferably carried out in an inert, oxygen-free atmosphere.

In another development of the process according to the invention, metals are admixed with the silicon, which are designated below as alloy elements, which lower the melting point of the silicon and thus lead to a lowering of the temperature for the formation of β-SiC. Below, the silicon/metal mixtures are also referred to as silicon alloys.

Metals are preferably used which are silicide-forming agents and/or carbide-forming agents. Preferably, metals are selected from the group which consists of Mo, Al, Fe, Ti, Cr, Ni, Cr, Mg, Cu, Co, and mixtures and alloys thereof. Fe, Cr, Ti, Al and/or mixtures thereof are particularly preferred.

In a particularly preferred embodiment, the siliconization is carried out using silicon and/or a silicon-containing substance, which preferably comprises a total of from 1 to 90% by weight of alloy elements, based on the weight of silicon.

In a further embodiment, the siliconization is carried out using silicon and/or silicon-containing substances, which comprises aluminum in an amount of from 1 to 35% by weight, based on the weight of silicon.

In a further embodiment, the siliconization is carried out using silicon and/or silicon-containing substances which comprise titanium in an amount of from 5 to 90% by weight, more preferably from 7 to 9% by weight or from 81 to 83% by weight, based on the weight of silicon.

The Si alloy melt has a distinctly lower melting point than the silicon itself, as a result of which the siliconization temperature can be reduced. In accordance with the degree to which the melting point is lowered due to the admixed metal, the process is preferably carried out at a temperature which lies above the melting point of the silicon alloy, but which lies below the melting point of pure silicon.

In addition, it has been found that when using silicon alloys for the melt infiltration, the sudden increase in volume which would occur on solidification of a pure silicon melt is reduced or substantially avoided.

When using a silicon alloy in the siliconization of the molded carbon-containing article, the problems caused by the straining forces of the solidified silicon can be avoided and consequently a higher strength, in particular with regard to thermal and mechanical alternating stresses, can be achieved. A highly advantageous factor is that at the same time the production process can be made simpler and less expensive. When using silicide-forming agents such as Mo, Fe and/or Ti, the content of free Si in the final products can be decreased.

If aluminum is present in the alloy elements used, this can be oxidized to aluminum oxide after the siliconization by the addition of oxygen or an oxygen-containing atmosphere. The aluminum oxide can in this case act advantageously as an adhesion promoter for catalytically active coatings, which can be applied to the molded porous or highly porous ceramic article containing β-SiC in a subsequent coating process.

The pyrolysis of the molded articles containing silicon and carbon and the siliconization of the molded article containing silicon and carbon can be carried out in two separate process steps. The two-stage procedure for effecting pyrolysis and siliconization can also be combined in a single-stage process. The gaseous products (pyrolyzates) formed during the pyrolytic decomposition of the binder and any extrusion auxiliaries which may be present do not have a significantly adverse effect on the siliconization. According to a preferred development of the invention, the siliconization, the pyrolysis, and the reactive conversion to SiC, SiC/C, Si/SiC and/or Si/SiC/C ceramics are carried out together in an inert atmosphere in a single process step. Preferably, the pyrolysis takes place under a blanket of nitrogen with constant purging in order to expel the pyrolysis products. The siliconization preferably takes place in an inert, oxygen-free atmosphere, more preferably in vacuo or under a blanket of argon.

According to the invention, a molded porous ceramic article containing β-SiC is made available, which has a mean pore diameter, which is also designated as a mean pore size, in the range of from 0.1 μm to 50 μm, preferably from 5 to 35 μm, more preferably from 10 to 25 μm and most preferably from 4 to 15 μm. The mean pore size is to be understood as meaning the average pore size resulting from the average value of all pore sizes. The pore diameter can also be designated as the pore size.

In one embodiment, the porosity of the molded article containing β-SiC as obtained in step (c) is increased following this siliconization step by removal of the silicon which has not been converted to SiC. Preferably, the removal of the silicon is effected by chemical dissolution of silicon taking place under the action of acid and/or alkali or with heating of the molded articles containing β-SiC with liquefaction and/or evaporation of silicon, the removal of the liquefied and/or evaporated silicon being very preferably additionally assisted by the application of reduced pressure.

The release of the free silicon can alternatively be carried out by evaporation of the silicon at a suitable temperature above the vaporizing temperature of silicon, preferably above 1400° C. and more preferably at temperatures of from 1400° C. to 1900° C. In one embodiment, the evaporation of the silicon is carried out at temperatures of from 1400° C. to 1700° C.

Preferred developments of the molded porous ceramic articles containing β-SiC are defined in the subordinate claims 22 to 44.

The porosity of the molded article containing β-SiC is preferably in a range of from 5% to 90%, more preferably from 20% to 80% and most preferably from 30% to 65%. For porous particulate filter media, the porosities are preferably adjusted to a range of from 20% to 70% and more preferably from 30% to 65%. The percent porosity designates the open volume based on the volume of the solid structure. The porosity is to be understood as meaning the sum of the cavities, particularly the open pores, in a solid, porous article, based on its overall volume. The sum of the cavities is stated here in percent, based on the overall volume, which is 100%.

Preferably, the molded article containing β-SiC has a differential pore distribution having a peak, preferably a unimodal peak. The differential pore distribution results from the specific pore volume ($mm^3/g$) as a function of the pore size (μm) and is measured, for example, by means of mercury intrusion. Mercury intrusion is carried out according to DIN 66133. Measurement by mercury intrusion yields the pore volume based on the total weight of the specimen investigated for a given pore size. The differential pore distribution thus represents the specific pore volume for a given pore size. The specific pore volume indicates the pore volume for a given pore size based on the total weight of the specimen investigated. The position of the peak maximum of the differential pore distribution curve indicates the most frequently occurring pore size.

Preferably, the molded porous article containing β-SiC has a differential pore distribution having a unimodal peak whose maximum is in the range of from 1 to 25 μm. Preferably, the width of this peak at half height is not more than 1.5 times the most frequent pore size. More preferably, the peak width at half height is equal to half its pore size and most preferably it is not more than 80% of the most frequent pore size (cf. FIG. 5). For example, the width of a peak which has a maximum at a pore size of 4 μm, is not more than 6 μm at half height (1.5 times the most frequent pore size), whilst the peak width is equal to the difference between the larger and the smaller pore diameters at the peak half height.

Preferably, the β-SiC present in the molded porous article containing β-SiC according to the invention consists of β-SiC (cubic crystal form of SiC) to an extent of 90% by weight, preferably 95%, more preferably 98% by weight and most preferably 100% by weight. These percentages relate to Si not mixed with alloy elements. β-SiC is formed from silicon and carbon at temperatures of from 1450 to 1900° C.

The molded porous article containing β-SiC has a three-dimensional, continuous β-SiC skeleton, which preferably comprises β-SiC crystals having a particle size of from 0.1 μm to 100 μm and more preferably from 0.1 μm to 10 μm.

Preferably, the porous β-SiC skeleton of the molded porous article containing β-SiC according to the invention has a residual content of free, unconverted silicon, which is preferably equal to not more than 20% by weight, more preferably not more than 10% by weight and most preferably not more than 5% by weight, in each case based on the total weight of the porous molded article.

Preferably, the porous β-SiC structure of the molded porous article containing β-SiC according to the invention has a residual content of free, unconverted carbon, which is preferably equal to not more than 5% by weight based on the total weight of the porous molded article. In a preferred embodiment, the free unconverted carbon comprises carbon fibers.

In addition to SiC phases, there may be present Si/SiC phases, SiC/C phases, and/or Si/SiC/C phases in the molded ceramic article containing SiC. The formation of these phases can depend, for example, on the adjusted stoichiometric ratio of Si to C and/or alternatively on the nature of the silicon-containing substance used.

The molded porous ceramic article containing β-SiC according to the invention has a porous matrix, which contains or consists of SiC, SiC/C, Si/SiC, and/or Si/SiC/C. Preferably, the porous matrix is highly porous. The matrix of the molded article according to the invention is suitable as a particulate filter, for example a diesel soot filter.

Preferably, the molded ceramic article containing β-SiC has a channeled structure. Preferably, the channeled structure has a channel density of from 50 to 400 channels/inch$^2$, more preferably from 180 to 300 channels/inch$^2$ and most preferably from 200 to 300 channels/inch$^2$. Preferably, the channel walls have a thickness in the range of from 100 μm to 480 μm, preferably from 150 to 420 μm, more preferably from 150 μm to 400 μm, even more preferably from 200 μm to 380 μm and most preferably from 220 μm to 350 μm. In one embodiment the channels are substantially parallel to one another. In another embodiment the channels are substantially parallel to one another and extend in the direction of the longitudinal axis of the ceramic molded article.

In a preferred embodiment, the matrix of the ceramic molded article has a skeleton consisting substantially of β-SiC and any possible unconverted carbon. Here, in the core of the skeleton, carbon can still be present which is enveloped by SiC. In addition, a further layer of silicon or SiO$_2$ can be disposed on the SiC. An SiO$_2$ layer can protect the underlying silicon layer from further oxidation. In a preferred embodiment, the skeleton of the molded article contains no SiO$_2$.

According to a preferred development, the molded article containing β-SiC contains
from 0 to 10% by weight and preferably from 0 to 5% by weight, of carbon,
from 70 to 100% by weight and preferably from 90 to 100% by weight, of β-SiC, and
from 0 to 20% by weight and preferably from 1 to 5% by weight, of Si,
where the percentages by weight are in each case based on the total weight of the molded articles containing β-SiC and, taking into consideration any possible further components, always total 100% by weight.

The molded porous article containing β-SiC comprises a continuous three-dimensional β-SiC structure. "A continuous three-dimensional β-SiC structure" is to be understood, within the scope of the invention, as meaning a β-SiC structure which comprises reaction-bonded β-SiC, which forms a solid structure without further binder. In a further development, the continuous three-dimensional β-SiC structure has substantially no grain boundary and preferably has no grain boundary. In one embodiment the continuous three-dimensional β-SiC structure is not composed of β-SiC particles.

In conventional SiC structures, the SiC structure is bonded via a binder, for example molten silicon. The great advantage of a continuous SiC structure is that the molded article is significantly more stable and more resistant to aggressive media, such as, for example, motor vehicle exhaust gases. With conventional SiC structures, in which the SiC structure is bonded via binders, a breakdown of the binder takes place over time, for example by oxidation, and as a result the molded article is destroyed. The inventors have thus surprisingly succeeded in making available a molded porous article containing β-SiC which has outstanding chemical and mechanical resistances.

In a preferred embodiment, the molded article containing SiC contains other metals, preferably silicide-forming agents and/or carbide-forming agents. These metals are also referred to below as Si alloy elements. These other metals can be present in an amount of from 1% by weight to 90% by weight, such percentages by weight referring to the weight of silicon. Preferably, said other metals are selected from the group which consists of Mo, Al, Fe, Ti, Cr, Ni, Mg, Cu, Co, Mn, and mixtures and alloys thereof. The Si alloy elements are preferably present within the SiC structure as carbides and/or silicides. The Si alloy elements preferably do not form a binding phase between the SiC crystals.

In a particularly preferred embodiment, the molded porous article containing β-SiC comprises aluminum in an amount of from 1 to 35% by weight, based on the weight of silicon. By the addition of aluminum in a range of from 1 to 35% by weight, the melting point of the Si alloy is decreased to as low as 1150° C.

In a further preferred embodiment, the molded porous article containing β-SiC comprises titanium in an amount of from 5 to 90% by weight, based on the weight of silicon. By the addition of from 5% by weight to 90% by weight of titanium, the melting point of the Si alloy is decreased to as low as 1350° C. More preferably, the molded porous article containing β-SiC comprises titanium in a concentration of from 7 to 9% by weight or from 81 to 83% by weight, based on the weight of silicon.

Preferably, the molded article containing β-SiC comprises, in addition to β-SiC, phases composed of or containing iron silicide(s), preferably FeSi$_2$ and/or FeSi, chromium silicide(s), preferably CrSi$_2$, and/or titanium silicide(s), preferably TiS$_2$, Ti$_3$Si$_5$, and/or TiC$_2$Si$_2$, and/or cobalt silicide(s), CoSi$_2$, CO$_2$Si, and/or CoSi.

Furthermore, the molded article containing SiC can comprise, in addition to SiC, also phases composed of or containing metal carbides. Preferably, said other metals are selected from the group which consists of Mo, Al, Fe, Ti, Cr, Ni, Mg, Cu, Co, Mn, and mixtures and alloys thereof.

According to a further embodiment, the molded article containing β-SiC is fiber-reinforced. The fibers, preferably carbon fibers (for example PAN (polyacrylonitrile) or pitch fibers) and/or chopped strands of β-SiC (whiskers) have already been introduced into the composition to be extruded during the preparation of the molded carbon-containing articles and cause an increase in strength of the molded articles. The β-SiC chopped strands cause a purely mechanical increase in strength. The content of the β-SiC chopped strands is chosen such that the newly formed β-SiC structure is not adversely affected thereby. The carbon fibers, however, cause a distinct improvement in the thermal shock stability. The silicon reacts primarily with the particles of the biomorphic carbon to give β-SiC and envelops the carbon fibers. This envelopment of the carbon fibers protects them from any oxidizing conditions that may occur.

The use of natural fibers and/or polymer fibers can furthermore cause aligned pore structures to be produced in the molded article. The fibers are pyrolyzed during the pyrolysis treatment that is preferably carried out. As a result, preferably linear or aligned pores having a defined pore diameter are produced in the molded carbon-containing article, which, after siliconization, are present in the molded ceramic article containing β-SiC. The diameter of the fibers used determines the diameter of the aligned pores. Preferably, the length of the natural fibers and/or polymer fibers lies in a range of from 100 to 500 μm. The pores formed by the pyrolysis preferably have a length of from 50 to 500 μm. Preferably, the diameter of the aligned or linear pores lies in a range of from 5 to 50 μm and more preferably from 8 to 25 μm. The adjustment of a defined pore diameter makes it possible to provide filters having defined filtering properties in an extremely advantageous manner. The defined pore size of the aligned pores can be adjusted such that, for example, the separation of a particle mixture into particles of various sizes is possible.

According to a preferred embodiment, the molded article containing β-SiC is a filter, preferably a particulate filter, more preferably a diesel soot filter. Preferably, the filter consists of a number of parts which are can be, or are, interconnected by an adhesive. Particular preference is given to an adhesive which is a ceramic refractory cement, which, due to the admixture of thermally highly conductive material, has a heat conductivity of more than 10 W/mK. The expression "refractory adhesive" is to be understood, within the scope of the invention, as meaning a ceramic-based composition which cures chemically or hydraulically and is thermally resistant to a temperature up to at least 1000° C. and preferably up to 1600° C.

The molded article containing β-SiC preferably has a cuboidal or cylindrical shape. The molded article can alternatively have a polygonal cross section, for example a hexagonal or octagonal cross section. Preferably, the extruded article containing carbon and silicon has channels which extend in the direction of the longitudinal axis of the molded article and which are disposed substantially parallel to one another.

According to a preferred variant, the channels are not through channels. In this variant, the channels are preferably alternately closed. That is to say, the channels lying essentially parallel to one another are alternately closed at one or other of their ends. This makes it possible to use such a molded ceramic article containing β-SiC as a filter, the medium to be filtered passing through the wall of one channel into the neighboring channel and the particulate impurities being retained thereby. In one advantageous embodiment, the highly porous molded ceramic article has channels and porous diaphragm bridges.

The object of the invention is additionally achieved by a system which contains a molded porous ceramic article containing β-SiC as defined in any one of claims 21 to 44. The molded article is consequently suitable for use in a filtering system.

For example, the system can be an exhaust gas system of a motor vehicle or an exhaust gas treatment unit of a combustion engine, in which the molded porous ceramic article containing β-SiC is disposed. The molded article of the invention is particularly suitable for use as a diesel soot filter.

The molded porous ceramic article containing β-SiC as defined in the present invention can also be used as a catalyst supporting structure and in appropriate catalyst systems.

The process according to the invention thus facilitates the provision of a molded article containing β-SiC in which the energy expenditure is lower during production and the wear and tear of the mold dies is decreased. Furthermore, the molded porous article containing β-SiC according to the invention is suitable for retaining fine dust particles, which are having an increasingly adverse effect on the environment.

The very fine distribution of pores in the molded article according to the invention is necessary for effective soot filtration in an exhaust gas unit of a diesel engine. If the pores are too large, the soot particles are increasingly deposited in the wall structure and a deep-bed filtration effect occurs, i.e. the soot particles cause a great increase in the pressure resistance in the wall, which can no longer be made retrogressive using most regeneration processes. In the molded porous article according to the invention, the pores are so fine that the soot deposits on the surface of the filter in the form of a porous layer. In this case, the pressure drop incurred by this porous surface layer is not so great as in the case of said deep-bed filtration effect and the soot on the surface of the filter can be very easily removed by the use of conventional regeneration processes, for example by burn-off or combustion.

According to the invention, a molded article is obtained which is outstandingly suitable for effective diesel soot filtration. For example, a round diesel soot filter according to the invention having an inflow area of 165 cm$^2$ and a diameter of 14.4 cm, and having a length of 18 cm has, in new condition (without soot load), a maximal pressure difference of not more than 200 mbar at a temperature of 600° C. and a mass flow rate of 600 kg/h.

EXAMPLES

The present invention will be explained in greater detail with reference to the following examples, but is in no way restricted thereto.

Example 1

Molded β-SIC Article Produced by Extrusion of an Si-Containing Carbon Composition Followed by Conversion of the Carbon and Silicon to Silicon Carbide An extruded molded article was produced by the process described in DE 101 04 882. To the mixture there was added a hyperstoichiometric amount of silicon instead of clay, followed by mixing and extrusion.

In order to produce the channeled structure of silicon and carbon, silicon powder and powdered activated carbon were mixed with phenolic resin. These components were then processed together with cellulose ether, water, and a plasticizer in a kneading machine to form an extrudable composition. This mixture was subsequently extruded to give a channeled body, which was dried by means of microwave technology under a blanket of nitrogen. The channels had a wall thickness of 265 μm and the channel density was 200 cpsi (cells per square inch or channels per inch$^2$).

The composition of the mixture used for extrusion is given in Table 1.

TABLE 1

| Component | Percentage by weight |
| --- | --- |
| Activated carbon | 8.4 |
| Phenolic resin | 12.6 |
| Silicon powder | 40 |
| Cellulose ether | 4 |
| Water | 24 |
| Lubricants | 7 |
| Plasticizers | 2 |
| Soap | 2 |

The activated carbon had a $d_{50}$ value of between 8 and 15 μm. The particle-size distribution of the activated carbon was in the range of from 0.001 to 35 μm. The silicon powder had a maximum particle size of 75 μm, and the $d_{50}$ value was 26.5. (cf. FIG. 6).

Figure 1:
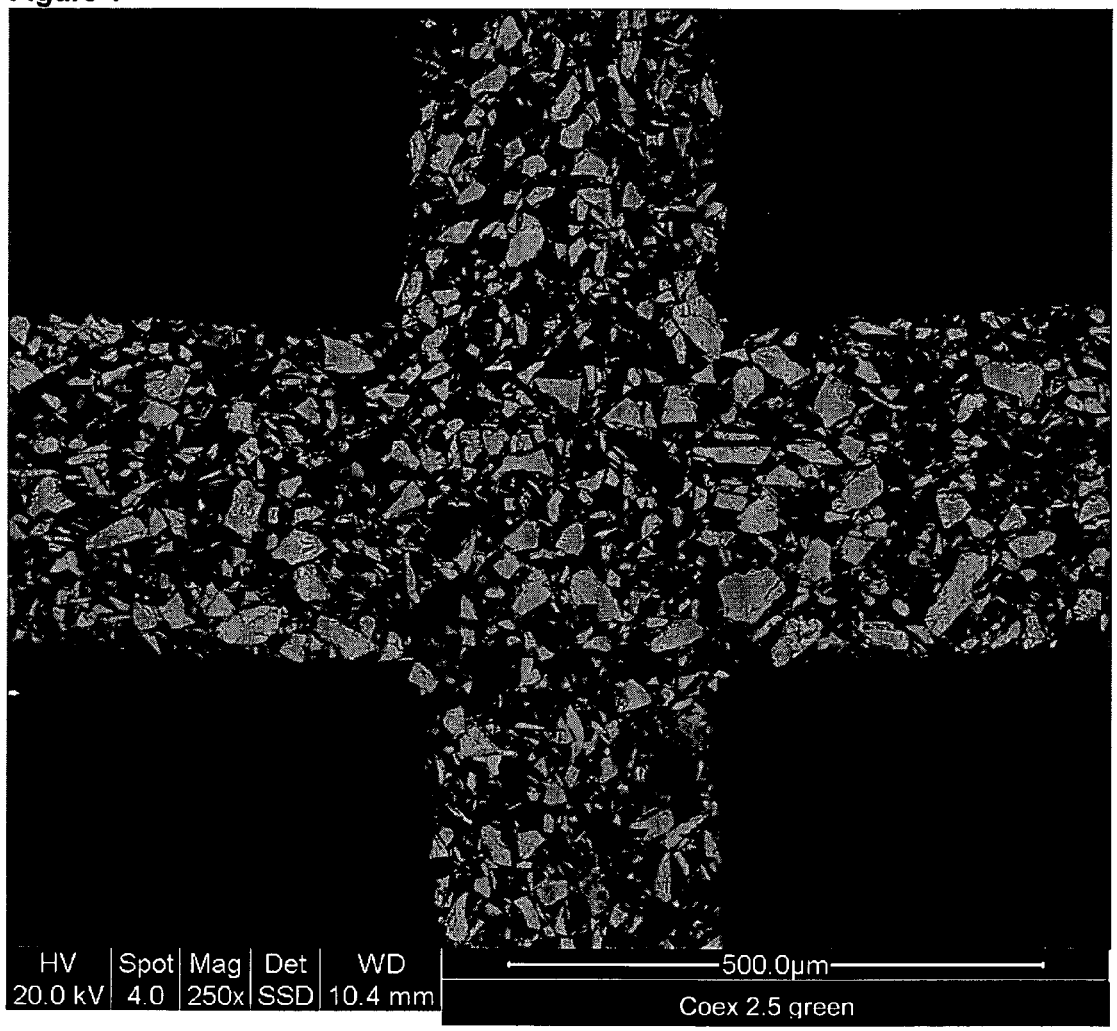
FIG. 1 shows an electron microscopic enlargement of the extruded green article from Example 1, which has been dried by means of microwave technology.

An electron microscopic enlargement of this dried structure is shown in FIG. 1. The high content of silicon homogeneously mixed with the activated carbon, the resin, and the aggregates is clearly discernable. It is equally discernible that this structure is still very dense and shows scarcely any porosity. Furthermore the particles are not agglomerated.

Figure 2:
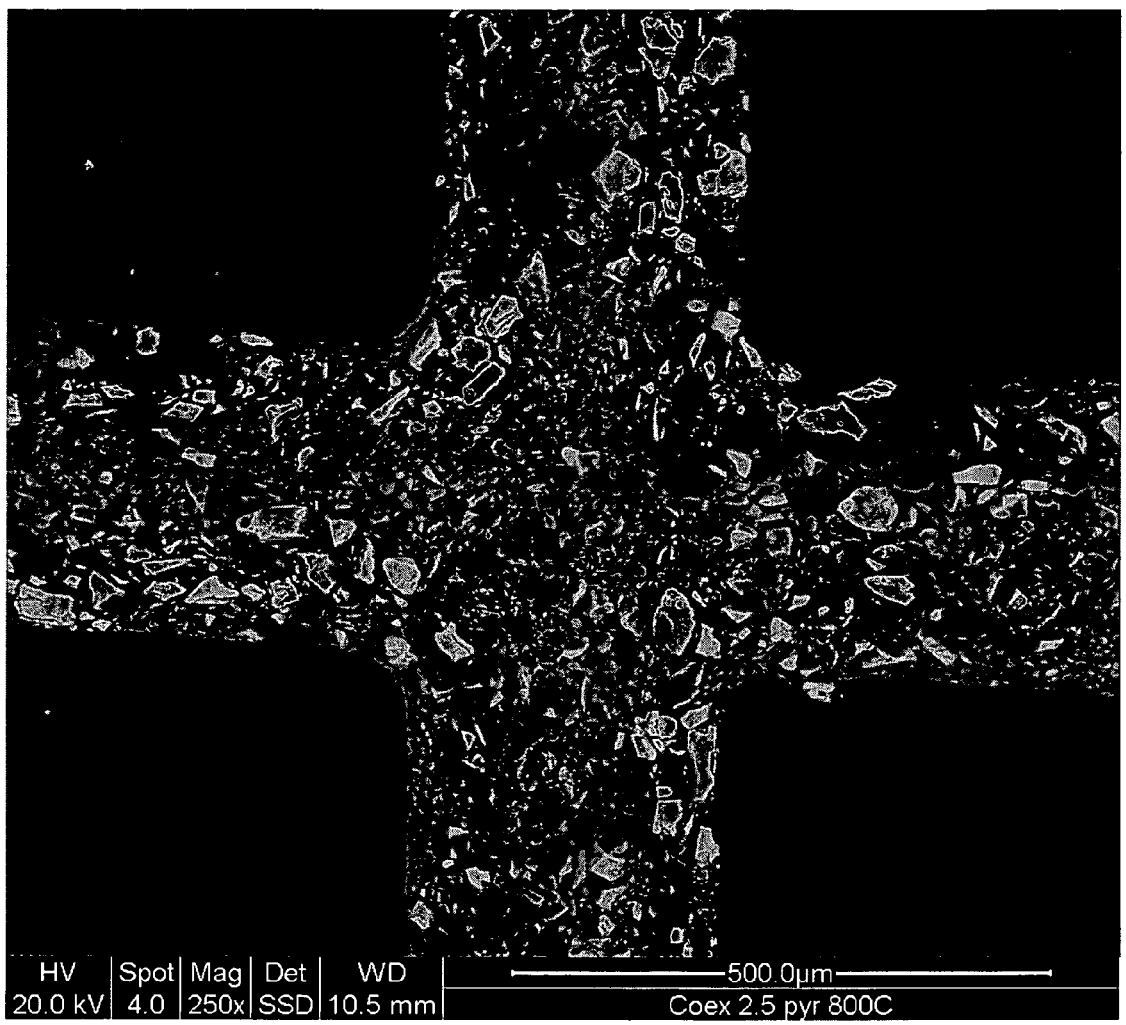
FIG. 2 shows an electron microscopic enlargement of the molded porous article of Example 1 after pyrolysis at 800° C. under a blanket of nitrogen.

The phenolic resin present in the molded article was then thermally cross-linked. The molded article was pyrolyzed at 800° C. under a blanket of nitrogen. A porous molded article was produced from a silicon/carbon mixture by the pyrolysis. An electron microscopic image of this structure is illustrated in FIG. 2. In this image it is readily discernible that the silicon particles are homogeneously distributed in a porous carbon lattice.

Figure 3:
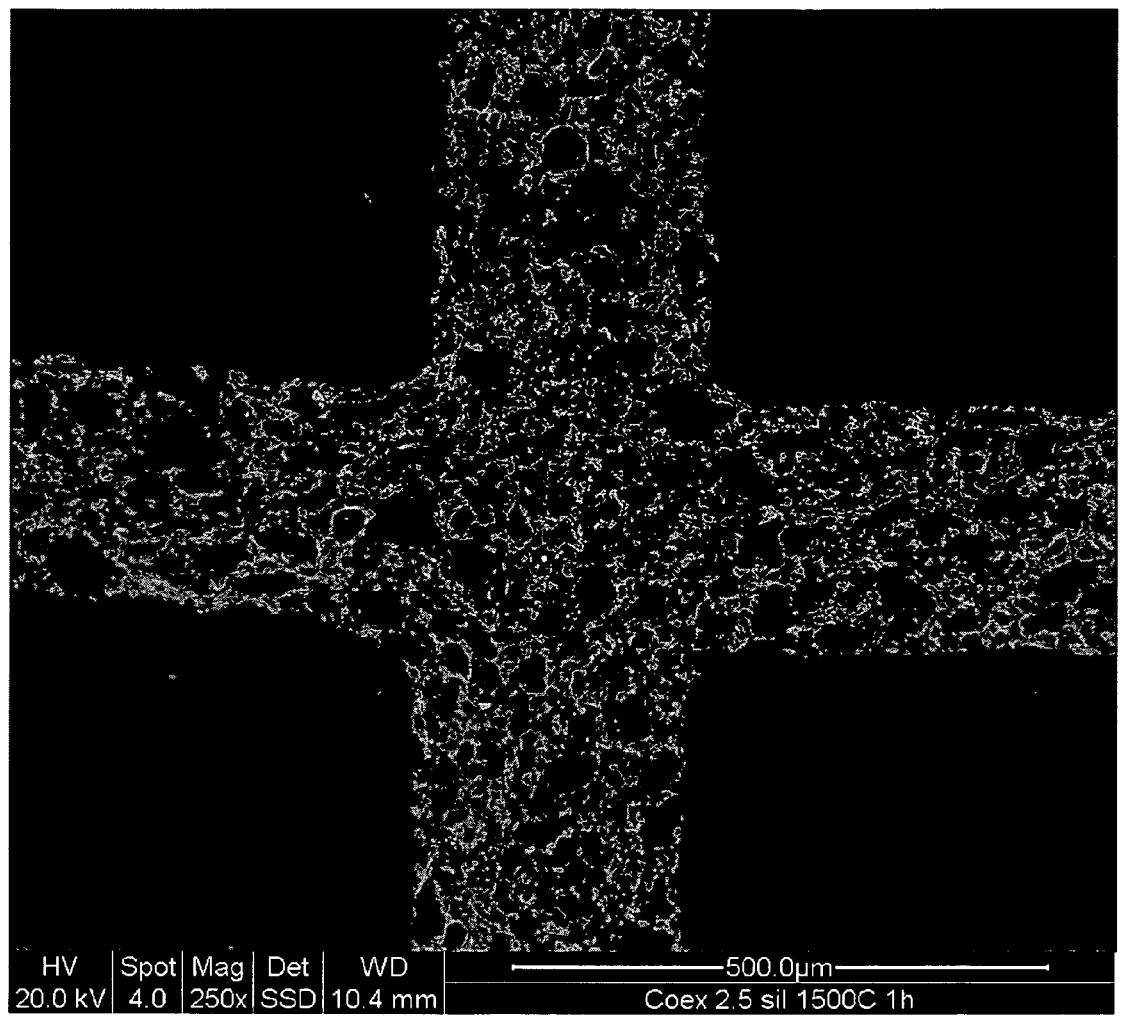
FIG. 3 shows an electron microscopic enlargement of the molded porous article of Example 1 after the molded porous article has been siliconized at 1500° C.
Figure 4:
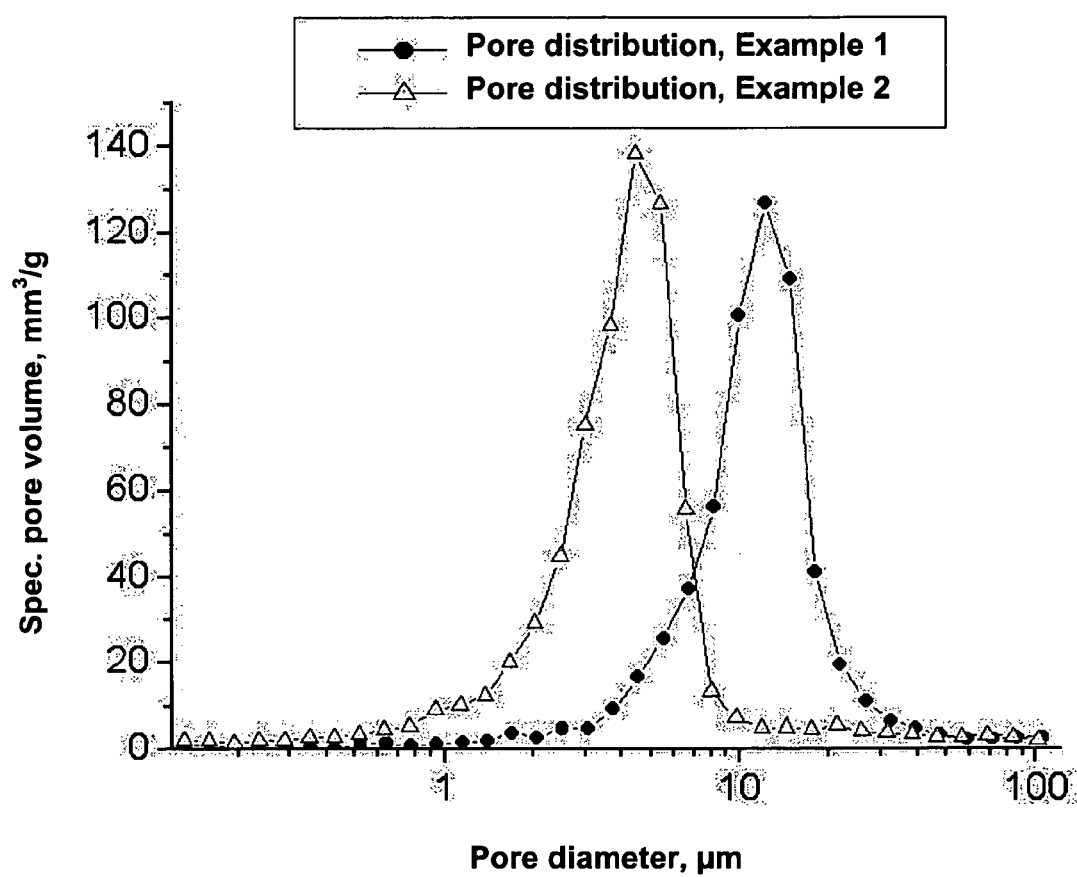
FIG. 4 shows the specific pore volume [mm$^3$/g] as a function of the pore size [μm] for a molded article (logarithmic plotting) produced as described in Examples 1 and 2 (differential pore distribution).
Figure 7:
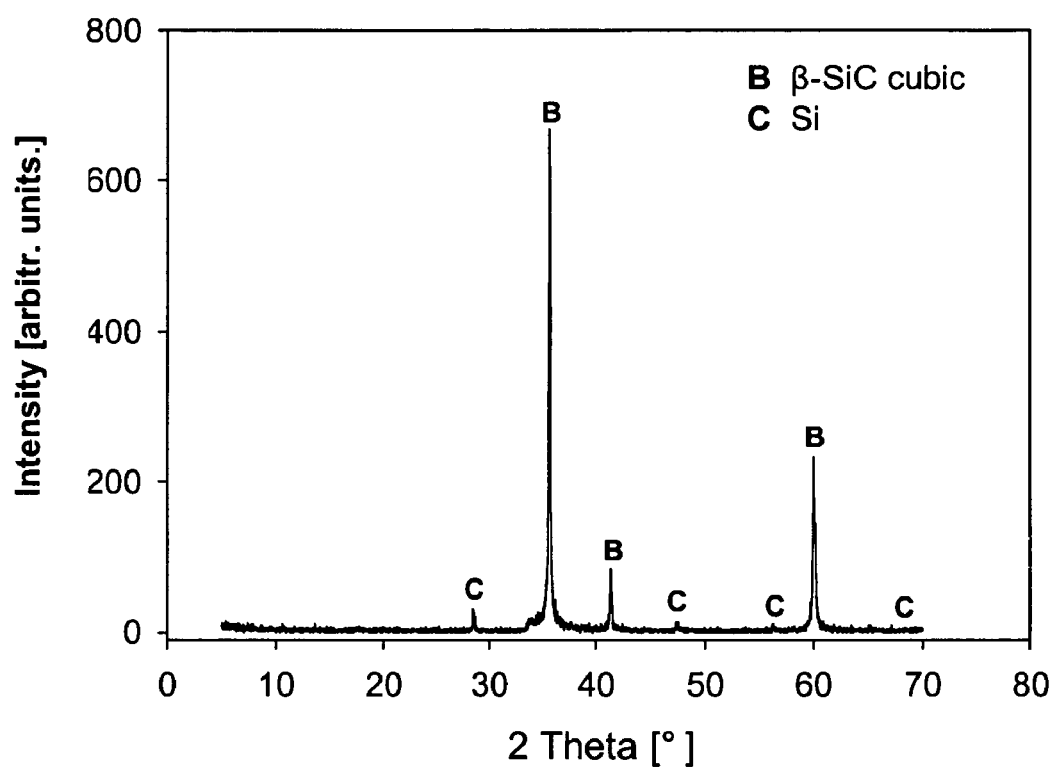
FIG. 7 shows the X-ray wide-angle spectrum of the molded article of Example 1. It can be clearly discerned that the porous molded article contains β-SiC only.

The molded article was then heated to 1500° C. under a blanket of argon or in vacuo, this temperature being maintained for one hour. A molded porous, high-strength article containing β-SiC was produced by this heat treatment. An image of this porous β-SiC structure is shown in FIG. 3. When comparing FIG. 3 with FIG. 2 it is clearly seen that the pores in the β-SiC structure are caused by molten grains of silicon absorbed in the carbon structure. The differential pore distribution of this structure was determined by means of mercury porosimetry, i.e. the mercury intrusion process, and is shown in FIG. 4. There is obtained a very narrow pore distribution between 5 μm and 25 μm, and the average pore size is 12 μm. The X-ray wide angle spectrum in FIG. 7 shows exclusively the characteristic peaks for β-SiC and no peak for α-SiC. There is only a small portion of residual silicon present in a concentration of not more than 5%.

Example 2

Example 2 is a repetition of Example 1 except that a silicon powder having a particle-size range of from 0 to 45 μm and a $d_{50}$ value of 7.6 was used.

Figure 5:
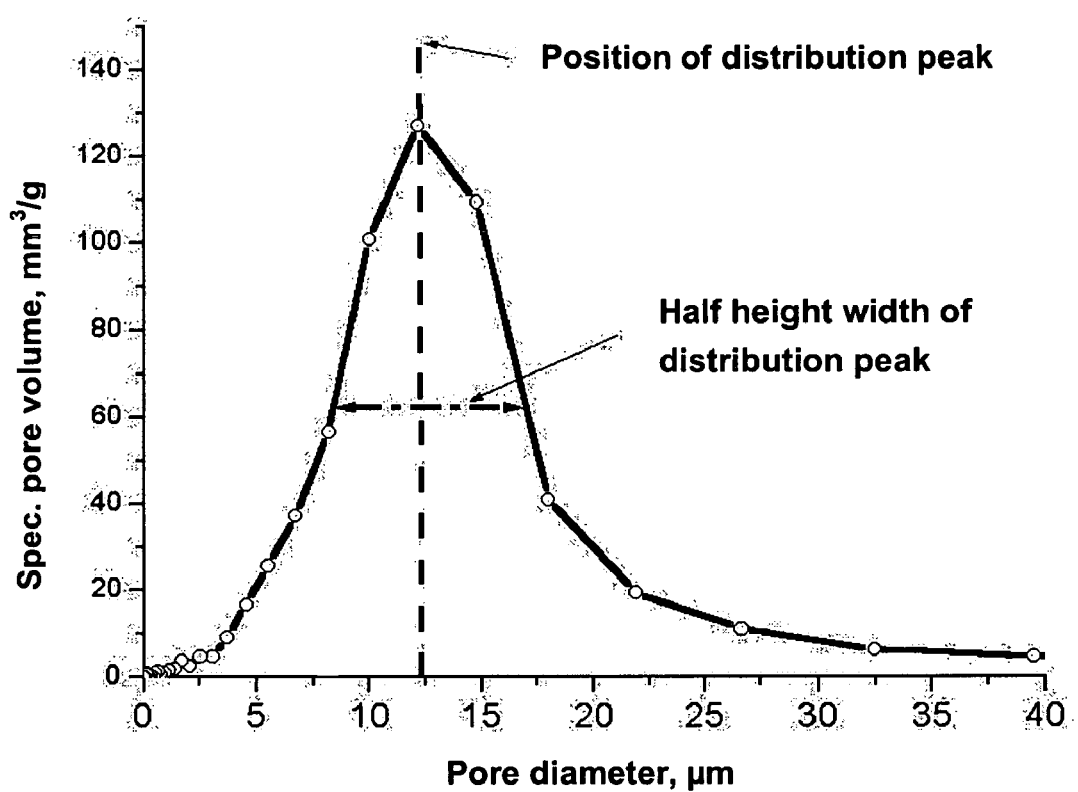
FIG. 5 shows the differential pore distribution for the molded article of Example 1, i.e. the specific pore volume [mm$^3$/g] as a function of the pore size [μm] (linear plotting).
Figure 6:
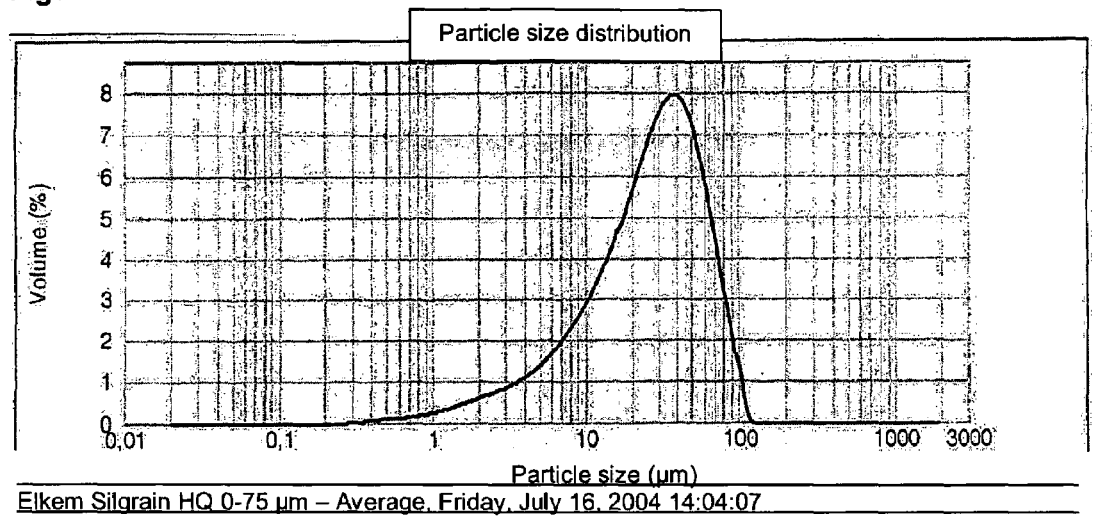
FIG. 6 shows the particle size distribution of the silicon powder used for the molded article of Example 1, represented by the volume of the silicon particles as a function of the respective particle size based on the total volume of all silicon particles.

From the graphs in FIGS. 5 and 6 it can be seen how the size distribution of the Si powder is transferred to the pore distribution.

Comparative Example 3

The molded article described in Comparative Example 3 was produced under the conditions stated in Example 1 of U.S. Pat. No. 6,582,796B1.

Comparison between Example 1 and Comparative Example 3

Figure 8:
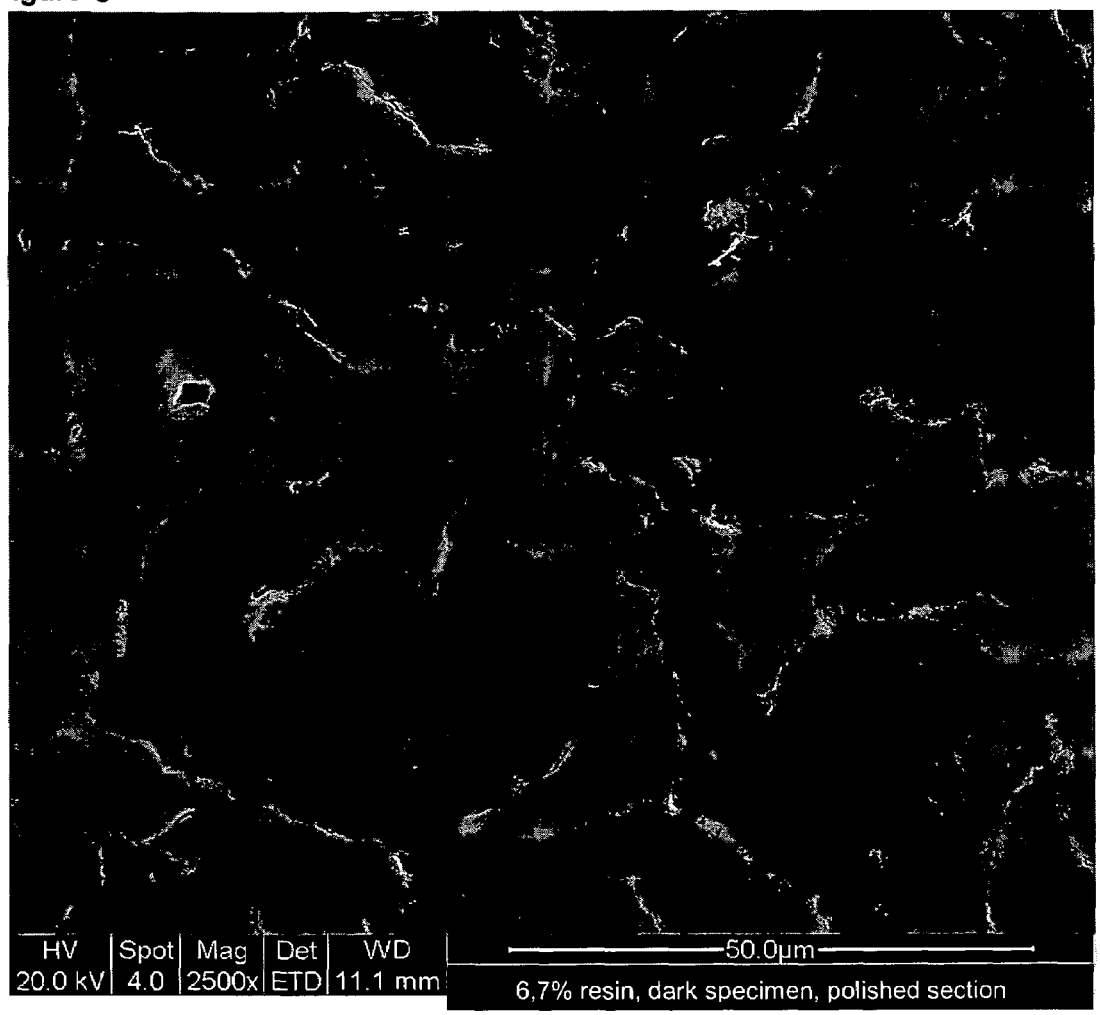
FIG. 8 shows an electron microscopic enlargement of the molded porous article of Example 1 after the molded porous article has been siliconized at 1500° C. The light gray regions show the continuous β-SiC skeleton. The dark gray regions show pores which have been filled with resin acting as contrast medium.
Figure 9:
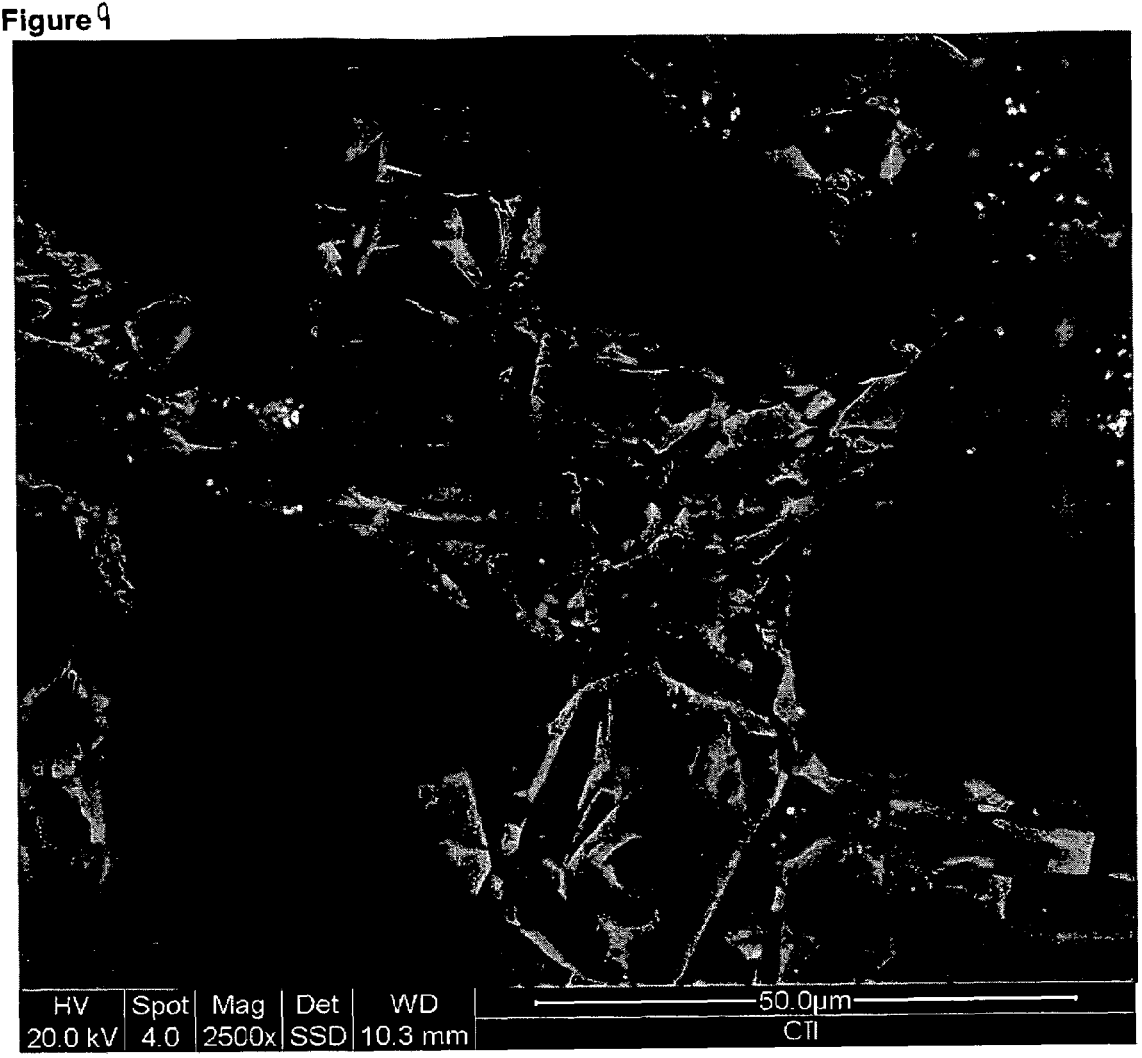
FIG. 9 shows an electron microscopic enlargement of the molded porous article of Comparative Example 3. The light gray regions show SiC grains embedded in an oxidic ceramic binder matrix. The dark gray regions show pores which have been filled with resin acting as contrast medium.

A continuous three-dimensional β-SiC skeleton is a β-SiC skeleton in which the β-SiC structure is present in one piece. This is the case when the β-SiC skeleton results directly from the reaction of silicon and carbon as described in Example 1 (cf. FIG. 8). By contrast, a molded article is formed, in Comparative Example 3, from silicon carbide, in which the individual SiC particles are bonded by a ceramic binder phase, particularly one comprising $SiO_2$. In this case the individual SiC particles are present in an $SiO_2$ matrix. The separate grain boundaries are clearly discernible. This type of grain structure shows much less stability than a continuous three-dimensional β-SiC skeleton.

What is claimed is:

1. A molded porous ceramic article containing β-SiC, wherein the molded porous ceramic article containing β-SiC exhibits pores having an average pore size in the range of from 0.1 μm to 50 μm and a continuous three-dimensional β-SiC skeleton, wherein a starting material used in forming the molded article containing β-SiC contains other metals, said other metals being at least one selected from the group consisting of silicide forming agents and carbide forming agents, and wherein said other metals are selected from the group consisting of Mo, Al, Fe, Ti, Cr, Ni, Mg, Cu, Co, Mn and mixtures and alloys thereof.

2. The molded porous ceramic article containing β-SiC as defined in claim 1, wherein the molded porous ceramic article containing β-SiC exhibits a porosity in the range of from 5% to 90%.

3. The molded porous ceramic article containing β-SiC as defined in claim 1, wherein the molded porous ceramic article containing β-SiC has differential pore-size distribution having a unimodal peak with a maximum in the range of from 1 to 25 μm and a half-height width of this peak is not more than 1.5 times a most frequent pore size.

4. The molded porous ceramic article containing β-SiC as defined in claim 1, wherein a molded article containing silicon and carbon, from which the molded porous ceramic article containing β-SiC has been produced, exhibits a channeled structure.

5. The molded porous ceramic article containing β-SiC as defined in claim 1, wherein the molded porous ceramic article containing β-SiC exhibits a channeled structure having a channel density of from 50 to 400 channels/inch$^2$.

6. The molded porous ceramic article containing β-SiC as defined in claim 1, wherein the molded porous ceramic article containing β-SiC exhibits channels whose channel walls have a thickness in the range of from 100 μm to 480 μm.

7. The molded porous ceramic article containing β-SiC as defined in claim 1, wherein a molded article containing silicon and carbon from which the molded porous ceramic article containing β-SiC has been produced, is at least one of pyrolyzed and siliconized under non-oxidizing conditions.

8. The molded porous ceramic article containing β-SiC as defined in claim 1, wherein the molded ceramic article containing β-SiC exhibits a porous matrix comprising at least one of SiC, SiC/C, Si/SiC, and Si/SiC/C.

9. The molded porous ceramic article containing β-SiC as defined in claim 1, wherein a matrix of the ceramic molded article is a skeletal structure consisting substantially of SiC and any unconverted carbon, and exhibiting at least one of Si and SiC at a surface.

10. The molded porous ceramic article containing β-SiC as defined in claim 1, wherein said other metals are present, in all, from 1 to 90% by weight, based on the weight of silicon.

11. The molded porous ceramic article containing β-SiC as defined in claim 1, wherein the content of aluminum is from 1 to 35% by weight, based on the weight of silicon.

12. The molded porous ceramic article containing β-SiC as defined in claim 1, wherein the content of titanium is from 5 to 90% by weight, based on the weight of silicon.

13. The molded porous ceramic article containing β-SiC as defined in claim 1, wherein the molded article containing β-SiC comprises, in addition to SiC, phases consisting of or containing at least one selected from the group consisting of iron silicide(s), chromium silicide(s), titanium silicide(s), and cobalt silicide(s).

14. The molded porous ceramic article containing β-SiC as defined in claim 1, wherein the molded article containing β-SiC is fiber-reinforced.

15. The molded porous ceramic article containing β-SiC as defined in claim 14, wherein the molded article containing β-SiC is reinforced by carbon fibers.

16. The molded porous ceramic article containing β-SiC as defined in claim 1, wherein the molded article containing β-SiC exhibits directed or linear pore structures.

17. The molded porous ceramic article containing β-SiC as defined in claim 1, wherein the molded article containing β-SiC has a cuboid or cylindrical shape and substantially parallel channels extend through the molded article, which channels are not through channels.

18. The molded porous ceramic article containing β-SiC as defined in claim 17, wherein the channels are alternately closed.

19. The molded porous ceramic article containing β-SiC as defined in claim 1, wherein the molded article containing β-SiC is a filter.

20. The molded porous ceramic article containing β-SiC as defined in claim 19, wherein the filter comprises several of said molded porous ceramic articles bonded together by an adhesive.

21. The molded porous ceramic article containing β-SiC as defined in claim 20, wherein the adhesive is a ceramic refractory adhesive, which has a heat conductivity of more than 10 W/mK due to admixture of highly heat conductive material.

22. A process for the production of a molded porous ceramic article
containing β-SiC as defined in claim 1,
wherein the process comprises the following steps:
(a) preparation of a porous molded article containing silicon and carbon from a mixture comprising silicon-containing particles having a particle size in the range of from 0.001 to 190 μm and containing carbon particles having a particle size in the range of from 0.001 to 150 μm and an organic coking binding agent,
(b) pyrolysis of the molded article containing silicon and carbon prepared in step (a), at a temperature of from 600° to 1000° C.; and
(c) siliconization of the molded article containing silicon and carbon by heating it to a temperature in the range of from 115° to 1700° C. to form the molded article containing β-SiC.

23. The process as defined in claim 22,
wherein the particles containing carbon exhibit an internal surface area according to BET of at least 350 m$^2$/g.

24. The process as defined in claim 22,
wherein the molded article containing silicon and carbon and prepared in step (b) exhibits a ratio by weight of silicon to carbon of from 2.33:1 to 5:1.

25. The process as defined in claim 22,
wherein the molded article containing silicon and carbon is extruded with a channeled structure.

26. The process as defined in claim 25,
wherein the channeled structure has a channel density of from 50 to 400 channels/inch$^2$.

27. The process as defined in claim 25,
wherein the channel walls have a thickness in the range of from 100 μm to 480 μm.

28. The process as defined in claim 22,
wherein at least one of the pyrolysis and the siliconization is carried out in an inert atmosphere free from oxygen.

29. The process as defined in claim 22,
wherein the molded article containing β-SiC obtained in step (c) exhibits at least one of a residual content of free unconverted silicon of not more than 20% by weight, based on the total weight the molded article and, a residual content of free unconverted carbon of not more than 10% by weight, based on the total weight the molded article.

30. The process as defined in claim 29,
wherein the free, unconverted carbon consists at least partially of carbon fibers.

31. The process as defined in claim 22,
wherein the molded article containing silicon and carbon and prepared in step (a) contains polymer fibers.

32. The process as defined in claim 22,
wherein the particles containing carbon are selected from the group which consists of activated carbon, coke, coal, carbon black, graphite, pyrolyzed resin, and mixtures thereof.

33. The process as defined in claim 22,
wherein the particles containing carbon are at least partially formed of biomorphic carbon.

34. The process as defined in claim 33,
wherein the biomorphic carbon is produced from starting materials which are selected from the group which consists of wood, fruit kernels, fruit peel, and mixtures thereof.

35. The process as defined in claim 33,
wherein the biomorphic carbon is acid-activated.

36. The process as defined in claim 22,
wherein the silicon-containing particles used in step (a) comprise other metals, selected from the group consisting of at least one of suicide and carbide forming agents.

37. The process as defined in claim 22,
wherein the silicon-containing particles used in step (a) comprise other metals selected from the group which consists of Mo, Al, Fe, Ti, Cr, Ni, Cr, Mg, Cu, Co, Mn, and mixtures and alloys thereof.

38. The process as defined in claim 36,
wherein the proportion of other metals is, in all, from 1 to 90% by weight, based on the weight of silicon.

39. The process as defined in claim 37,
wherein the content of aluminum is from 1 to 35% by weight, based on the weight of silicon.

40. The process as defined in claim 37,
wherein the content of titanium is from 5 to 90% by weight, based on the weight of silicon.

41. The process as defined in claim 22,
wherein the silicon-containing particles are at least one selected from the group consisting of organic and inorganic silicon compounds.

42. A molded porous ceramic article containing β-SiC,
wherein the molded porous ceramic article has been produced by a process which comprises the following steps:
   (a) preparation of a porous molded article containing silicon and carbon from a mixture comprising silicon-containing particles having a particle size in the range of from 0.001 to 190 μm and containing carbon particles having a particle size in the range of from 0.001 to 150 μm and an organic coking binding agent,
   (b) pyrolysis of the molded article containing silicon and carbon prepared in step (a), at a temperature of from 600° to 1000° C.; and
   (c) siliconization of the molded article containing silicon and carbon by heating it to a temperature in the range of from 1150° to 1700° C. to form the molded article containing β-SiC,
wherein the article has an average pore size in the range of from 0.1 μm to 50 μm and a continuous three-dimensional β-SiC skeleton; and
wherein a starting material used in forming the molded article containing β-SiC contains other metals, said other metals being at least one selected from the group consisting of silicide forming agents and carbide forming agents, and wherein said other metals are selected from the group consisting of Mo, Al, Fe, Ti, Cr, Ni, Mg, Cu, Co, Mn and mixtures and alloys thereof.

43. A system,
comprising a molded porous ceramic article containing β-SiC as defined in claim 1.

44. The molded porous ceramic article containing β-SiC as defined in claim 2, wherein the molded porous ceramic article containing β-SiC exhibits a porosity in the range of from 30% to 65%.

45. The molded porous ceramic article containing β-SiC as defined in claim 13, wherein the iron silicide(s) is at least one selected from the group consisting of $FeSi_2$ and FeSi.

46. The molded porous ceramic article containing β-SiC as defined in claim 13, wherein the chromium silicide is $CrSi_2$.

47. The molded porous ceramic article containing β-SiC as defined in claim 13, wherein the titanium silicide(s) is at least one selected from the group consisting of $TiSi_2$, $Ti_3Si_5$ and $TiC_2Si_3$.

48. The molded porous ceramic article containing β-SiC as defined in claim 13, wherein the cobalt silicide(s) is at least one selected from the group consisting of $CoSi_2$, $Co_2Si$ and CoSi.

* * * * *